United States Patent [19]

Konno

[11] Patent Number: 4,732,721

[45] Date of Patent: Mar. 22, 1988

[54] METHOD FOR PRODUCTION OF SHAPED BODIES OF METAL SALTS OF POLYACRYLIC ACID

[75] Inventor: Tetsuo Konno, Ami, Japan

[73] Assignee: Agency of Industrial Science and Technology, Tokyo, Japan

[21] Appl. No.: 893,924

[22] Filed: Aug. 6, 1986

[30] Foreign Application Priority Data

Sep. 30, 1985 [JP] Japan .................. 60-214703
Sep. 30, 1985 [JP] Japan .................. 60-214704
Dec. 2, 1985 [JP] Japan .................. 60-269355

[51] Int. Cl.⁴ ............... B29C 33/10; B29C 43/02; C08F 8/42
[52] U.S. Cl. .................. 264/102; 264/126; 264/320; 264/325; 264/331.18; 264/DIG. 78; 525/329.7; 525/330.2
[58] Field of Search .......... 264/126, 319, 320, 325, 264/331.18, DIG. 78, 101, 102; 525/329.7, 330.2

[56] References Cited

U.S. PATENT DOCUMENTS

| | | | |
|---|---|---|---|
| 2,045,080 | 6/1936 | Hagedorn | 264/331.18 X |
| 2,586,148 | 2/1952 | Clark et al. | 264/DIG. 78 |
| 3,779,952 | 12/1973 | Leonard Jr. | 525/330.2 X |
| 4,183,991 | 1/1980 | Smiley et al. | 264/331.18 X |

*Primary Examiner*—Jeffery Thurlow
*Assistant Examiner*—Leo B. Tentoni
*Attorney, Agent, or Firm*—Oblon, Fisher, Spivak, McClelland & Maier

[57] ABSTRACT

A method for production of a shaped body having high mechanical strength, high modulus of elasticity, and good mold-releasing property, the method comprising steps of charging a metal salt of polyacrylic acid in powder form into a shaping mold; and press-forming the powder material into a shaped body under a pressure in a range of from 100 kg/cm² to 1,000,000 kg/cm².

6 Claims, 1 Drawing Figure

METHOD FOR PRODUCTION OF SHAPED BODIES OF METAL SALTS OF POLYACRYLIC ACID

BACKGROUND OF THE INVENTION

1. Field of the Invention

This invention relates to a method for production of shaped bodies of metal salts of polyacrylic acid.

The shaped bodies of metal salts of polyacrylic acid has high heat-resistant property and high modulus of compression-elasticity, hence they are useful in various industrial fields such as gears in machinery, materials in aeronautics, materials in architectural construction, and materials in electrical and electronics apparatuses and appliances.

2. Description of Prior Arts

As the method for shaping sodium polyacrylate, there has already been known one, in which the chemical compound is dissolved in an aqueous solvent and then the solution is cast into film form (see "Proceeding of Royal Society" by L. E. Nielson et al., 1964, 282A, page 137).

There has also been known a method, in which a mixture of polyacrylic acid powder and a divalent metal oxide is charged into a metal mold, then this metal mold is heated to a temperature higher than the melting point of polyacrylic acid to melt and react with the metal oxide to produce a metal salt of polyacrylic acid, and the metal salt is shaped under pressure into a desired configuration (see "Ion-Containing Polymers" by R. S. Stei, 1977).

The film as obtained by the above-mentioned casting method is very brittle, and contains many cracks and breakages, which is therefore of no practical use.

According to the above-mentioned latter method of reacting the molten polyacrylic acid and divalent metal oxide within the metal mold, the uniform mixing of both polyacrylic acid and metal oxide cannot be done, and moreover the reaction between polyacrylic acid and metal oxide cannot be effected stoichiometrically with the consequence that unreacted metal oxide remains in the shaped body in the form of a filler, which causes cavities and non-uniform portions within the resulting shaped body, thus cracks and breakages readily occur in the shaped body. Furthermore, according to the latter method, the mold-releasing property of the shaped body in inferior.

Moreover, according to the conventional techniques of forming the shaped body, the metal species for the metal salt of polyacrylic acid to be molded into the shaped body was limited to a small number such as alkali metal, alkaline earth metal, zinc, and others, because of limitation in solubility of the metal salt of polyacrylic acid, and reactivity between polyacrylic acid and metal oxide.

SUMMARY OF THE INVENTION

In view of the above-described problem inherent in the known method of producing shaped bodies of metal salts of polyacrylic acid, it is the primary object of the present invention to provide an improved method of producing shaped bodies having good mold-releasing property, high mechanical strength, and high modulus of elasticity, by use of metal salt of polyacrylic acid as the resin material for the compression-forming, which is infusible under heat.

According to the present invention in general aspect of it, there is provided a method for production of a shaped body of metal salt of polyacrylic acid which comprises steps of: charging a metal salt of polyacrylic acid in powder into a mold; and pressure-forming the powder material into a shaped body under a pressure in a range of from 100 $kg/cm^2$ to 1,000,000 $kg/cm^2$.

The foregoing object, other objects as well as specific procedures to follow in the production of the shaped article according to the present invention will become more apparent and understandable from the following detailed description including several preferred examples thereof, when read in conjunction with the accompanying drawing.

DETAILED DESCRIPTION OF PREFERRED EMBODIMENTS

1. Metal Salts of Polyacrylic Acid

Figure 1:
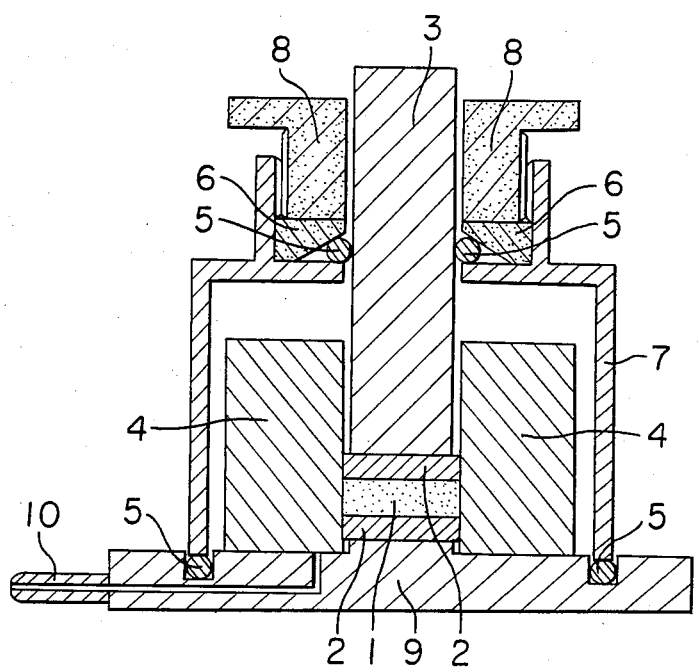
FIG. 1 is a cross-sectional view of a pressure-forming device for use in Example 1 of the present invention.

Alkali metal salt can be obtained from general market. Polyvalent metal salt is obtained by, for example, reacting polyacrylic acid and metal hydroxide in an aqueous solution, or polyacrylic acid and a metal salt in an aqueous solution of alkali metal hydroxide, at such a ratio that the metal ions may be 0.1 to 20 equivalent with respect to 1 equivalent of carboxyl group (—COOH) in the polyacrylic acid; and causing metal salt of polyacrylic acid to deposit as the sedimentation.

Examples of metal ions are: $Li^+$, $Na^+$, $K^+$, $Rb^+$, $Cs^+$, $Be^{2+}$, $Mn^{2+}$, $Mg^{2+}$, $Ca^{2+}$, $Sr^{2+}$, $Ba^{2+}$, $La^{3+}$, $Ti^{4+}$, $Cr^{3+}$, $Fe^{3+}$, $Co^{2+}$, $Ni^{2+}$, $Cu^+$, $Zn^{2+}$, $Al^{3+}$, $Sn^{4+}$, $Pb^{2+}$, and so forth. These metal ions may also be used in mixture.

Polyacrylic acid can be obtained by homopolymerization of acrylic acid, or copolymerization of 80 to 99 mol% of acrylic acid and 20 to 1 mol% of other vinyl monomer. The degree of polymerization of this polyacrylic acid is in a range of from 50 to 1,000,000. For the purpose of rendering the shaped body to have high mechanical strength, a higher degree of polymerization is preferable, hence a value of 100 or above is desirable. On the other hand, aqueous solution of polyacrylic acid to be used at the time of producing the metal of polyacrylic acid should preferably have its degree of polymerization of 100,000 or below, because the lower the degree of polymerization is, the smaller becomes its viscosity, hence the easier is its handling.

The metal salt of polyacrylic acid which has been deposited by sedimentation after the reaction is made by first separating the aqueous solvent from it by filtration, then removing unreacted substance, by-produced salts, etc. by washing, and drying the metal salt of polyacrylic acid (or, depending on necessity, pulverizing the same into powder of 0.01 to 500 microns). In order to obtain a compact shaped body, the particle size of the shaping material should preferably be as small as possible, hence a value of 200 microns or below is desirable. On the other hand, the particle size of the shaping material should preferably be as large as possible from the standpoint of its handling, hence a value of 0.1 micron or above is desirable.

The metal salt of polyacrylic acid is non-fusible, and does not melt at a temperature of 500° C. or below and under a pressure of from 1 to 100,000 atm. Of these metal salts of polyacrylic acid, polyvalent metal salts are preferably used to alkali metal salts, since the former is capable of producing the shaped bodies having a higher modulus of elasticity.

2. Production of Shaped Body

The shaped body of the metal salt of polyacrylic acid is produced by first charging the shaping material into a cavity 1 of a compression metal mold as shown in FIG. 1, and then pressure-forming the same at a temperature of from 50° C. to 500° C. (preferably 100° C. or above for accelerating the shaping, and 400° C. or below for preventing the polyacrylic acid component from decomposition) and under a pressure of from 100 to 1,000,000 kg/cm$^2$ (preferably 1,000 kg/cm$^2$ or above for obtaining a compact shaped body, and 100,000 kg/cm$^2$ or below from the standpoint of pressure-withstand capability of the mold which is readily available and repeatedly usable).

The atmosphere at the time of the pressure-forming may be any of nitrogen gas, helium gas, air, and so on. The pressure-forming should preferably be done under the vacuum condition (0.0001 to 100 mmHg).

The compression-molding device as shown in the drawing is constructed with a cavity 1, a housing material 2 for forming the cavity, a piston rod 3, a cylinder 4, an O-ring 5, an O-ring stopper 6, an outer cylinder 7, an upper part of the outer cylinder 8, a lower part of the outer cylinder 9, and an exhaust tube 10.

The shaped body to be produced by the present invention may take various configurations such as rods, plates, toothed gears, and others. The shaped body may also be subjected, depending on necessity, heat-treatment, cutting work, perforating work, and so forth.

The effect to be resulted from the present invention will be as follows:

(1) The shaped body may assume various configurations such as rod, plated, block, cam, toothed gears, etc., not being limited to film form alone.

(2) The shaped body has high modulus of compression easticity (e.g., 3 Giga-Pascal (GPa) or higher according to the Japanese Industrial Standard (JIS) system) and high heat-resistant property. Also, it is free from cracks and breakages.

In the following, the present invention will be described in further details with reference to several preferred embodiments thereof.

EXAMPLE OF PRODUCTION OF METAL SALT OF POLYACRYLIC ACID POWDER

Powder 1: Sodium polyacrylate powder available in general market having a degree of polymerization of 18,000 was used as it was.

Powder 2: A metal compound solution prepared by dissolving 0.1 equivalent of $ZnCl_2$ into 300 cc of pure water was dropped in agitation into polyacrylic acid solution prepared by dissolving 0.1 equivalent of polyacrylic acid having a degree of polymerization of 5,000 and 0.1 equivalent of NaOH into 500 cc of pure water. The resulted sedimentation was repeatedly filtered and washed with water, followed by drying and crushing, from which zinc polyacrylate powder having an equivalent ratio of 1:1 between zinc and polyacrylic acid was obtained.

Powder III to XIV: Each solution of various metal compounds was dropped into polyacrylic acid solution, as shown in Table 1, and the resulted sedimentation was filtered and washed with water repeatedly, followed by drying and crushing the same, from which metal salt of polyacrylic acid in powder form was obtained.

Powder XVI: A metal compound solution prepared by dissolving 0.1 equivalent of $TiCl_4$ into a solution composed of 270 cc of pure water and 30 cc of methanol was dropped in agitation into polyacrylic acid solution prepared by dissolving polyacrylic acid having a degree of polymerization of 5,000 into 500 cc of pure water. In addition to this, NaOH solution prepared by dissolving 0.1 equivalent of NaOH into 200 cc of water was dropped in agitation into the above-mentioned mixture solution. The resulted sedimentation was repeatedly filtered and washed with water, followed by drying and crushing the same, from which titanium polyacrylate powder having an equivalent ratio of 1:1 between titanium and polyacrylic acid was obtained.

Powder XVII to XXII: Each solution of various metal compounds was dropped in agitation into polyacrylic acid solution in Table 1, after which NaOH solution was dropped in agitation into the mixture solution. The resulted sedimentation was repeatedly filtered and washed with water, followed by drying and crushing the same, from which metal salt of polyacrylic acid in powder as shown in Table 1 was obtained.

In powders II through XXII, the formation of the metal salt of polyacrylic acid was verified by the X-ray diffraction, in which no peak appeared in crystallinity of metal oxides, metal hydroxides, metal chlorides, and so forth, and by the infrared ray absorption spectrum, in which absorption of $>CO$ disappeared at the wavelength of 1,700 cm$^{-1}$ and the absorption peak appeared at the wavelength of 1,550 cm$^{-1}$ due to formation of the metal salt.

EXAMPLE 1

1.6 g of the afore-described Powder 1 was charged into the cavity (1) formed by the housing material (2,2) of the metal mold and the cylinder (4) having an inner diameter of 2 cm, as shown in FIG. 1.

Subsequently, while deaerating the interior of the cavity through the exhaust tube (10) by means of a vacuum pump, a pressure of 5,000 kg/cm$^2$ was applied to the charged material for 30 minutes at a temperature of 200° C. to subject it to shaping. After this, the metal mold was cooled to a room temperature, and a circular disc of 3 mm thick and 20 mm in diameter was taken out therefrom.

The disc had a specific gravity of 1.71 and assumed colorless transparency.

The disc was cut into a parallelipipedic form having a dimension of 15 mm long, 8 mm wide, and 2 mm thick. When this shaped body was measured for its modulus of compression elasticity, at 20° C. and at a cross-head speed of 0.5 mm/min. by use of an autograph of K.K. Shimadz Seisakusho, Japan, it was found to be 13.4 GPa. Also, the modulus of compression elasticity in the direction perpendicular to the above was found to be 13.4 GPa.

EXAMPLE 2 to 27

The Powders II to XXII as shown in Table 1 were each charged into the mold in a quantity as shown in Table 2, and then the pressure-forming operation was conducted under the forming conditions as indicated in the same Table 2 to thereby obtained the shaped body having the physical properties as shown therein.

COMPARATIVE EXAMPLE 1

A solution prepared by dissolving 10 g of sodium polyacrylate powder used in Example 1 into 200 cc of pure water was cast on a glass plate, after which it was dried for five hours at 200° C. to thereby obtain a brown transparent film having a thickness of 100 μm.

This film was found to be so brittle that it was readily broken.

COMPARATIVE EXAMPLE 2

A mixture powder consisting of 1 mol of very fine powder of polyacrylic acid having a degree of polymerization of 3,500 and 0.5 mol of very fine powder of ZnO was charged into a metal mold, and the shaping of the charged material was conducted under the respective conditions, in which it was press-formed at 200° C. and under a pressure of 350 atm. for 10 minutes; at 250° C. and under 350 atm. for 10 minutes; at 250° C. and under 350 atm. for minutes; at 250° C. and under 350 atm for 10 minutes; at 275° C. and under 700 atm. for 10 minutes; at 300° C. and under 700 atm. for 10 minutes; and at 300° C. and under 700 atm. for 10 minutes, with the pressure having been returned to the normal pressure level at every 10 minutes.

The shaped product as obtained had a length of 6.35 cm, a width of 1.275 cm and a thickness of 0.335 cm.

The shaped product had a specific gravity of 2.02 and was white-translucent in color. It showed its modulus of bending elasticity of 19.0 GPa as measured under the conditions of a distance of 50 mm between the fulcrums and an established test speed of 0.5 mm/min.

This shaped product showed its difficulty in mold-releasing, and brought about cracks in one part thereof.

COMPARATIVE EXAMPLE 3

A mixture powder consisting of 1 mol of very fine powder of polyacrylic acid used in Comparative Example 2 and 0.5 mol of very fine powder of CaO was press-formed into a product in the same manner as in Comparative Example 2.

The thus obtained shaped product had its specific gravity of 1.80, and was white-translucent in color. Its modulus of bending elasticity was 16.2 GPa as measured in the same manner as in Comparative Example 2.

The shaped product showed its difficulty in mold releasing and brought about cracks in one part thereof.

While, in the foregoing, the present invention has been described with reference to specific examples thereof, it should be understood by those skilled in the art that the invention is capable of a variety of modifications and changes within the spirit and scope of the invention as recited in the appended claims.

TABLE 1

| | Polyacrylic acid solution | | | Metal compound solution | | | NaOH solution | | Metal salt powder of |
|---|---|---|---|---|---|---|---|---|---|
| | Water (cc) | Polyacrylic acid (degree of polymerization (equivalent)) | NaOH (equivalent) | Water (cc) | Methanol (cc) | Metal compound (kind equivalent) | Water (cc) | NaOH (equivalent) | polyacrylic acid (Kind of metal ions (equivalent ratio))* |
| Powder II | 500 | 5000 (0.1) | 0.1 | 300 | 0 | $ZnCl_2$ (0.1) | 0 | 0 | Zn(1) |
| Powder III | 500 | 5000 (0.1) | 0.2 | 300 | 0 | $ZnCl_2$ (0.2) | 0 | 0 | Zn(2) |
| Powder IV | 500 | 5000 (0.1) | 0.2 | 300 | 0 | $CaCl_2$ (0.2) | 0 | 0 | Ca(2) |
| Powder V | 500 | 5000 (0.1) | — | 500 | 0 | $Ba(OH)_2$ (0.1) | 0 | 0 | Ba(1) |
| Powder VI | 500 | 5000 (0.1) | 0.1 | 300 | 0 | $MgCl_2$ (0.05) $AlCl_3.6H_2O$ (0.05) | 0 | 0 | Mg(0.5)Al(0.5) |
| Powder VII | 500 | 5000 (0.1) | 0.2 | 300 | 0 | $MgCl_2$ (0.1) $AlCl_3.6H_2O$ (0.1) | 0 | 0 | Mg(1)Al(1) |
| Powder VIII | 500 | 5000 (0.1) | 0.1 | 300 | 0 | $CaCl_2$ (0.05) $AlCl_3.6H_2O$ (0.05) | 0 | 0 | Ca(0.5)Al(0.5) |
| Powder IX | 500 | 5000 (0.1) | 0.2 | 300 | 0 | $CaCl_2$ (0.1) $AlCl_3.6H_2O$ (0.1) | 0 | 0 | Ca(1)Al(1) |
| Powder X | 500 | 5000 (0.1) | 0.2 | 300 | 0 | $BaCl_2$ (0.1) $AlCl_3.6H_2O$ (0.1) | 0 | 0 | Ba(1)Al(1) |
| Powder XI | 500 | 5000 (0.1) | 0.1 | 300 | 0 | $ZnCl_2$ (0.05) $AlCl_3.6H_2O$ (0.05) | 0 | 0 | Zn(0.5)Al(0.5) |
| Powder XII | 500 | 5000 (0.1) | 0.2 | 300 | 0 | $ZnCl_2$ (0.1) $AlCl_3.6H_2O$ (0.1) | 0 | 0 | Zn(1)Al(1) |

TABLE 2

| Example No. | Shaping material | | | Shaping conditions | | | Shaped product | | | Modulus of compression elasticity (GPa) | |
|---|---|---|---|---|---|---|---|---|---|---|---|
| | Powder No. | Kind of metal ions | Quantity used (g) | Temp. (°C.) | Pressure (kg/cm²) | Time (min.) | Specific gravity | Color | Transparency | | |
| 1 | I | Na(1)* | 1.6 | 200 | 5000 | 30 | 1.71 | colorless | translucent | 13.4 | 13.4 |
| 2 | II | Zn(1) | 2.0 | 200 | 5000 | 60 | 2.03 | light brown | transparent | 24.4 | 24.2 |
| 3 | II | Zn(1) | 2.0 | 200 | 6000 | 60 | 2.04 | " | " | 32.4 | 31.8 |
| 4 | III | Zn(2) | 2.1 | 200 | 5000 | 60 | 2.26 | white | translucent | 25.2 | 25.3 |
| 5 | IV | Ca(2) | 1.7 | 200 | 5000 | 60 | 1.82 | " | " | 20.3 | 20.0 |
| 6 | V | Ba(1) | 2.3 | 200 | 6000 | 60 | 2.38 | " | " | 20.9 | 20.7 |
| 7 | VI | Mg(0.5)Al(0.5) | 1.6 | 200 | 6000 | 60 | 1.65 | " | " | 26.6 | 26.0 |
| 8 | VII | Mg(1)Al(1) | 1.7 | 200 | 6000 | 60 | 1.75 | " | " | 25.1 | 25.0 |
| 9 | VIII | Ca(0.5)Al(0.5) | 1.6 | 200 | 5000 | 60 | 1.64 | " | " | 20.5 | 20.3 |
| 10 | IX | Ca(1)Al(1) | 1.8 | 200 | 5000 | 60 | 1.91 | " | " | 28.3 | 28.2 |
| 11 | IX | Ca(1)Al(1) | 1.8 | 200 | 7000 | 60 | 1.92 | " | " | 35.8 | 35.5 |
| 12 | X | Ba(1)Al(1) | 2.0 | 200 | 6000 | 60 | 2.10 | " | " | 26.5 | 26.3 |
| 13 | XI | Zn(0.5)Al(0.5) | 1.8 | 200 | 6000 | 60 | 1.84 | " | " | 21.6 | 22.0 |
| 14 | XII | Zn(1)Al(1) | 1.9 | 200 | 5000 | 60 | 2.01 | " | " | 26.7 | 26.4 |
| 15 | XIII | Al(2) | 1.7 | 200 | 6000 | 60 | 1.82 | white | translucent | 32.8 | 31.8 |
| 16 | XIV | Fe(3) | 2.3 | 200 | 6000 | 60 | 2.33 | red brown | non-transparent | 29.5 | 29.0 |

TABLE 2-continued

| Example No. | Powder No. | Kind of metal ions | Quantity used (g) | Temp. (°C.) | Pressure (kg/cm$^2$) | Time (min.) | Specific gravity | Color | Transparency | Modulus of compression elasticity (GPa) | |
| --- | --- | --- | --- | --- | --- | --- | --- | --- | --- | --- | --- |
| 17 | XV | Ti(1) | 1.6 | 200 | 5000 | 60 | 1.67 | light brown | transparent | 16.6 | 16.1 |
| 18 | XVI | Ti(2) | 1.8 | 200 | 5000 | 60 | 1.85 | white | translucent | 17.1 | 17.5 |
| 19 | XVII | Ti(4) | 1.9 | 200 | 5000 | 60 | 1.95 | " | " | 22.0 | 21.8 |
| 20 | XVIII | Sn(1) | 1.7 | 200 | 5000 | 60 | 1.82 | light brown | transparent | 20.5 | 19.6 |
| 21 | XIX | Sn(2) | 1.9 | 200 | 5000 | 60 | 1.95 | white | translucent | 25.3 | 26.1 |
| 22 | XX | Sn(4) | 2.0 | 200 | 5000 | 60 | 2.04 | " | " | 28.4 | 27.8 |
| 23 | XXI | Ti(0.25)Al(0.5)Ca(0.25) | 1.7 | 200 | 6000 | 60 | 1.73 | " | " | 29.1 | 30.2 |
| 24 | XXII | Sn(0.5)Al(1.5) | 1.8 | 200 | 6000 | 60 | 1.91 | " | " | 31.1 | 30.1 |
| 25 | I | Na(1) | 1.6 | 150 | 7000 | 60 | 1.70 | colorless | translucent | 11.8 | 11.4 |
| 26 | II | Zn(1) | 2.0 | 250 | 5000 | 60 | 2.04 | light brown | transparent | 29.2 | 28.8 |
| 27 | XV | Ti(1) | 1.6 | 250 | 2000 | 120 | 1.65 | light brown | translucent | 15.2 | 14.9 |

What is claimed is:

1. A method for production of a shaped body, which comprises the steps of:
   (a) charging a metal salt of powdered polyacrylic acid into a shaping mold; and
   (b) pressure-forming said powder into a shaped body under a pressure in a range of from 1,000 kg/cm$^2$ to 100,000 kg/cm$^2$ at a temperature of from 100° C. to 400° C. in a vacuum.

2. The method according to claim 1, wherein said metal is one selected from the group consisting of Mg, Ca, Ba, Zn, Al, Fe, Ti and Sn.

3. A method according to claim 1, wherein the modulus of compression-elasticity of the shaped body as measured in accordance with Japanese Industrial Standard (JIS) K7208-1975 is 3 GPa or higher.

4. The method according to claim 1, wherein said powder comprises particles having a size of 0.01-500 microns.

5. The method according to claim 4, wherein said powder comprises particles having a size of 200 microns or less.

6. The method according to claim 1, wherein said vacuum comprises a pressure of 0.0001-100 mm Hg.

* * * * *